US010375728B2

(12) United States Patent
Ross et al.

(10) Patent No.: US 10,375,728 B2
(45) Date of Patent: *Aug. 6, 2019

(54) ENHANCED CHANNEL ACCESS MECHANISM FOR IMPROVING PERFORMANCE IN DENSE WIFI ENVIRONMENTS

(71) Applicant: Intel IP Corporation, Santa Clara, CA (US)

(72) Inventors: Rony Ross, Tel Aviv (IL); Noam Ginsburg, Haifa (IL)

(73) Assignee: Intel IP Corporation, Santa Clara, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 15/601,355

(22) Filed: May 22, 2017

(65) Prior Publication Data
US 2018/0042047 A1 Feb. 8, 2018

Related U.S. Application Data

(63) Continuation of application No. 14/228,575, filed on Mar. 28, 2014, now Pat. No. 9,661,656.

(60) Provisional application No. 61/940,214, filed on Feb. 14, 2014.

(51) Int. Cl.
*H04W 74/04* (2009.01)
*H04W 28/18* (2009.01)

(52) U.S. Cl.
CPC ............ *H04W 74/04* (2013.01); *H04W 28/18* (2013.01)

(58) Field of Classification Search
CPC ............................ H04W 74/04; H04W 28/18
See application file for complete search history.

(56) References Cited

U.S. PATENT DOCUMENTS

| 6,118,788 A | 9/2000 | Kermani et al. |
| 6,330,450 B1 | 12/2001 | Wallstedt et al. |
| 7,343,163 B1 | 3/2008 | Perkins et al. |
| 8,498,579 B2 | 7/2013 | Yonge, III et al. |
| 9,094,833 B2 | 7/2015 | Blasco Claret et al. |
| 9,661,656 B2 | 5/2017 | Ross et al. |

(Continued)

FOREIGN PATENT DOCUMENTS

| JP | 2012119778 A | 6/2012 |
| JP | 2012160895 A | 8/2012 |

(Continued)

OTHER PUBLICATIONS

"U.S. Appl. No. 14/228,575, Advisory Action dated Oct. 4, 2016", 3 pgs.

(Continued)

*Primary Examiner* — Rasheed Gidado
(74) *Attorney, Agent, or Firm* — Schwegman Lundberg & Woessner, P.A.

(57) ABSTRACT

Disclosed in some examples are methods, devices (e.g., STAs and APs), and machine readable mediums which utilize a Simultaneous Channel Access (SCA) to allow transmissions of a first wireless network to take place while transmissions are already ongoing in a second wireless network (the Principal Channel Access (PCA)). The SCA allows devices which support SCA to transmit frames even when other nearby devices on other networks have already accessed the medium and are engaged in frame transmission.

17 Claims, 11 Drawing Sheets

(56) References Cited

U.S. PATENT DOCUMENTS

| | | | |
|---|---|---|---|
| 10,015,821 B2* | 7/2018 | Oteri | H04W 74/0816 |
| 2005/0064818 A1 | 3/2005 | Assarsson et al. | |
| 2006/0067226 A1 | 3/2006 | Chandra et al. | |
| 2007/0297365 A1 | 12/2007 | Li et al. | |
| 2010/0267408 A1 | 10/2010 | Lee et al. | |
| 2012/0014336 A1* | 1/2012 | Seok | H04L 5/0007 370/329 |
| 2013/0295949 A1 | 11/2013 | Seo et al. | |
| 2014/0126461 A1 | 5/2014 | Ghosh et al. | |
| 2014/0328264 A1 | 11/2014 | Merlin et al. | |
| 2015/0071186 A1 | 3/2015 | Chen et al. | |
| 2015/0237652 A1 | 8/2015 | Ross et al. | |
| 2015/0359008 A1* | 12/2015 | Wang | H04W 74/004 370/330 |

FOREIGN PATENT DOCUMENTS

| | | |
|---|---|---|
| JP | 6353915 B2 | 6/2018 |
| JP | 6446574 B2 | 12/2018 |
| TW | I577221 B | 4/2017 |
| WO | WO-2015122958 A1 | 8/2015 |

OTHER PUBLICATIONS

"U.S. Appl. No. 14/228,575, Final Office Action dated Jul. 18, 2016", 16 pgs.

"U.S. Appl. No. 14/228,575, Non Final Office Action dated Feb. 18, 2016", 21 pgs.

"U.S. Appl. No. 14/228,575, Notice of Allowance dated Jan. 17, 2017", 8 pgs.

"U.S. Appl. No. 14/228,575, Response filed Sep. 16, 2016 to Final Office Action dated Jul. 18, 2016", 12 pgs.

"U.S. Appl. No. 14/228,575, Response filed Nov. 16, 2016 to Final Office Action dated Jul. 18, 2016", 12 pgs.

"U.S. Appl. No. 14/228,575, Response filed Apr. 22, 2016 to Non Final Office Action dated Feb. 18, 2016", 15 pgs.

"International Application Serial No. PCT/US2014/068729, International Preliminary Report on Patentability dated Aug. 25, 2016", 9 pgs.

"International Application Serial No. PCT/US2014/068729, International Search Report dated Mar. 17, 2015", 3 pgs.

"International Application Serial No. PCT/US2014/068729, Written Opinion dated Mar. 17, 2015", 7 pgs.

"Japanese Application Serial No. 2016-551274, Office Action dated Aug. 29, 2017", W/English Translation, 5 pgs.

"Taiwanese Application Serial No. 104101101, Office Action dated May 25, 2016", w/ partial English Translation, 11 pgs.

"Taiwanese Application Serial No. 104101101, Response filed Nov. 9, 2016 to Office Action dated May 25, 2016", W/ English Translation of specification and claims, 86 pgs.

"Japanese Application Serial No. 2016-551274, Response Filed Jan. 26, 2018 to Office Action dated Aug. 29, 2017", (W/ English Claims), 16 pgs.

* cited by examiner

ENHANCED CHANNEL ACCESS MECHANISM FOR IMPROVING PERFORMANCE IN DENSE WIFI ENVIRONMENTS

CLAIM OF PRIORITY

This patent application is a continuation of U.S. patent application Ser. No. 14/228,575, filed Mar. 28, 2014, which claims the benefit of priority, under 35 U.S.C. Section 119 to U.S. Provisional Patent Application Ser. No. 61/940,214, entitled "ENHANCED CHANNEL ACCESS MECHANISM FOR IMPROVING PERFORMANCE IN DENSE WIFI ENVIRONMENTS," filed on Feb. 14, 2014 to Ross and Ginsburg, each of which are hereby incorporated by reference herein in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Intel, All Rights Reserved.

TECHNICAL FIELD

Embodiments pertain to improving throughput in dense wireless environments. Some embodiments relate to improving throughput by improving channel access in dense environments, such as in a Wireless Fidelity (Wi-Fi) wireless system.

BACKGROUND

As a result of the prevalence of wireless devices and the limited amount of spectrum made available for their use, it is very common that several wireless networks in close proximity may share the same channel. According to the channel access rules, at any given moment only one device can successfully transmit a frame on the medium regardless of the network it is associated with. Thus two or more wireless networks must effectively share the same wireless medium. This impacts the performance of both networks in terms of capacity, throughput, jitter, and the like. This problem is only exacerbated by the proliferation of applications which have high bandwidth requirements such as high quality video and gaming. Due to the dense wireless environment, the performance of these demanding applications may be degraded.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
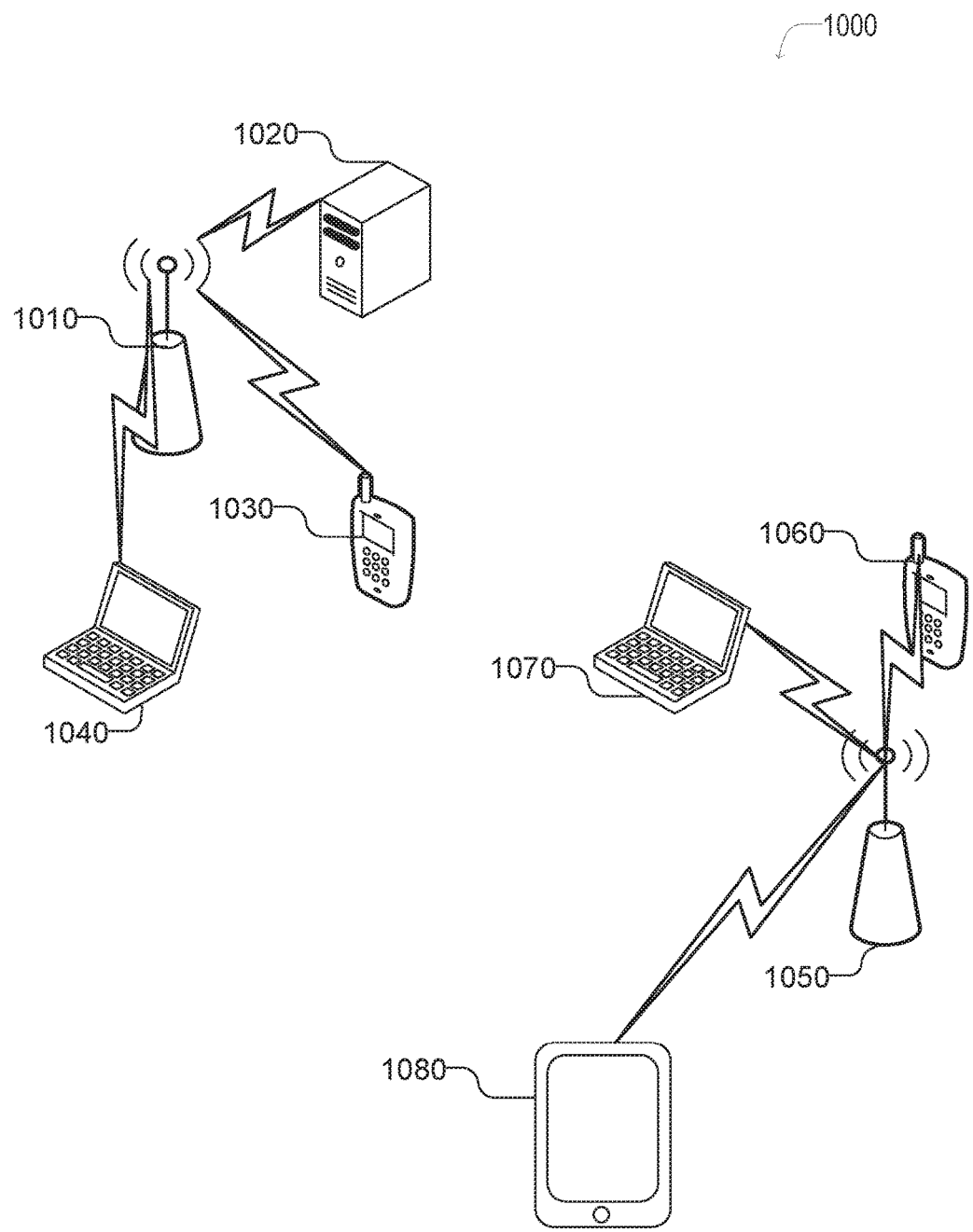
FIG. 1 is a schematic of overlapping wireless networks according to some examples of the present disclosure.

FIG. 1 shows a schematic of overlapping wireless networks according to some examples of the present disclosure. A first network provided by Access Point 1010 and a second network provided by Access Point (AP) 1050 are overlapping in the sense that one or more devices 1010-1040 may receive transmissions from one or more of devices 1050-1080 and in some examples, one or more of devices 1050-1080 may receive transmissions from one or more of devices 1010-1040. AP 1010 communicates with wireless stations (STA) in the form of a laptop 1040, smartphone 1030 and computing device 1020 while AP 1050 communicates with STAs in the form of a second laptop 1070, a second smartphone 1060 and a tablet 1080. If AP 1010 and AP 1050 are communicating using the same wireless medium (e.g., the same wireless channel), there is a potential for interference. In some examples, to avoid interference, the devices 1010-1080 may wait for the wireless medium to be free for a certain period of time prior to transmitting. In an urban environment where there is the potential for many conflicting networks with potentially dozens of devices competing for the wireless medium this can create delays for devices wishing to transmit information.

Example wireless networks with this problem include Wireless Fidelity (Wi-Fi) networks operating according to an Institute for Electrical and Electronics Engineers (IEEE) 802.11 standard (e.g., an 802.11ac standard). 802.11 networks have tried to solve this problem utilizing Quality of Service techniques which prioritize some packets at the expense of other packets. These QoS features are not universally accepted, and while they improve jitter sensitive applications, this is at the expense of other applications.

Disclosed in some examples are methods, devices (e.g., STAs and APs), and machine readable mediums which utilize a Simultaneous Channel Access (SCA) to allow transmissions of a first wireless network to take place while transmissions are already ongoing in a second wireless network (the Principal Channel Access (PCA)). The SCA allows devices which support SCA to transmit frames even when other nearby devices on other networks have already accessed the medium and are engaged in frame transmission.

The SCA is designed such that the nodes participating in the SCA may successfully transmit their information on the wireless medium without the nodes participating in the Principal Channel Access (PCA) transmission hearing the transmission. The PCA may be defined as the transmission on the wireless medium that was obtained by the transmitting node based upon the primary access rules for the medium. For example, in 802.11 networks, the PCA may be the node that successfully grabbed the medium through the Distributed. Coordination Function (DCF) utilizing Carrier Sense Multiple Access, Enhanced Distributed Channel Access (EDCA), Request to Send (RTS) and Clear To Send (CTS) exchanges, Point Coordination Function (PCF) techniques, Hybrid Coordination Function (HCF) techniques, the reverse direction grant (RDG) bit, and the like.

In order to ensure that the PCA transmission is not interfered with, the SCA nodes may control various transmission parameters of the SCA transmission. For example, the SCA devices may limit the transmission power of their SCA transmission such that PCA receiver receives any SCA transmissions at around −95 dBm or lower (lower than the noise floor). Note that because the PCA transmitter does not perform concurrent receive operations, it would not be affected by the SCA transmission, and as such, in some examples the SCA transmitter may not consider the effect of the SCA transmission on the PCA transmitter. The SCA transmitter must also ensure that the maximum allowable power level for the SCA channel allows for reception at the SCA receiver at a high enough signal to noise ratio (SNR) for a successful transmission, which requires choosing an appropriate transmission rate. Additionally, the receiver of the SCA device must be aware of the SCA transmission so that the SCA node knows to receive the message (rather than ignoring the medium for the entire time the PCA is transmitting).

The SCA devices may determine the transmission parameters that will prevent interference with receiving the PCA transmission by utilizing measurements taken of the wireless medium between the SCA device and the PCA receiver. In some examples, these measurements may be done prior to the SCA transmission. For example, an SCA device may periodically take measurements of all other devices on the medium. Then when the SCA device wishes to make an SCA transmission, the SCA device retrieves the measurements of the wireless medium taken for the PCA receiver and then utilizes these measurements to conform the transmission parameters of the SCA transmission to avoid interfering with reception of the PCA transmission. In some examples these measurements may be taken prior to the SCA transmission.

The measurements may be "open-loop" measurements that use measurements taken based upon messages sent by other devices on the medium that are not sent (e.g., not addressed to) to the SCA device (or even addressed to the same network as the SCA device), but are overheard by the SCA device. In some examples, an overheard message is received and processed by the node overhearing it, but not addressed to the node overhearing it. For example, control frames sent between a device and an access point. In other examples, the measurements may be "closed-loop" measurements that utilize specific exchanges of measurement or sounding messages between nodes. In still other examples, both open and closed loop measurements may be utilized. These measurement messages may be sent at a full power level to ensure a proper measurement.

Figure 2:
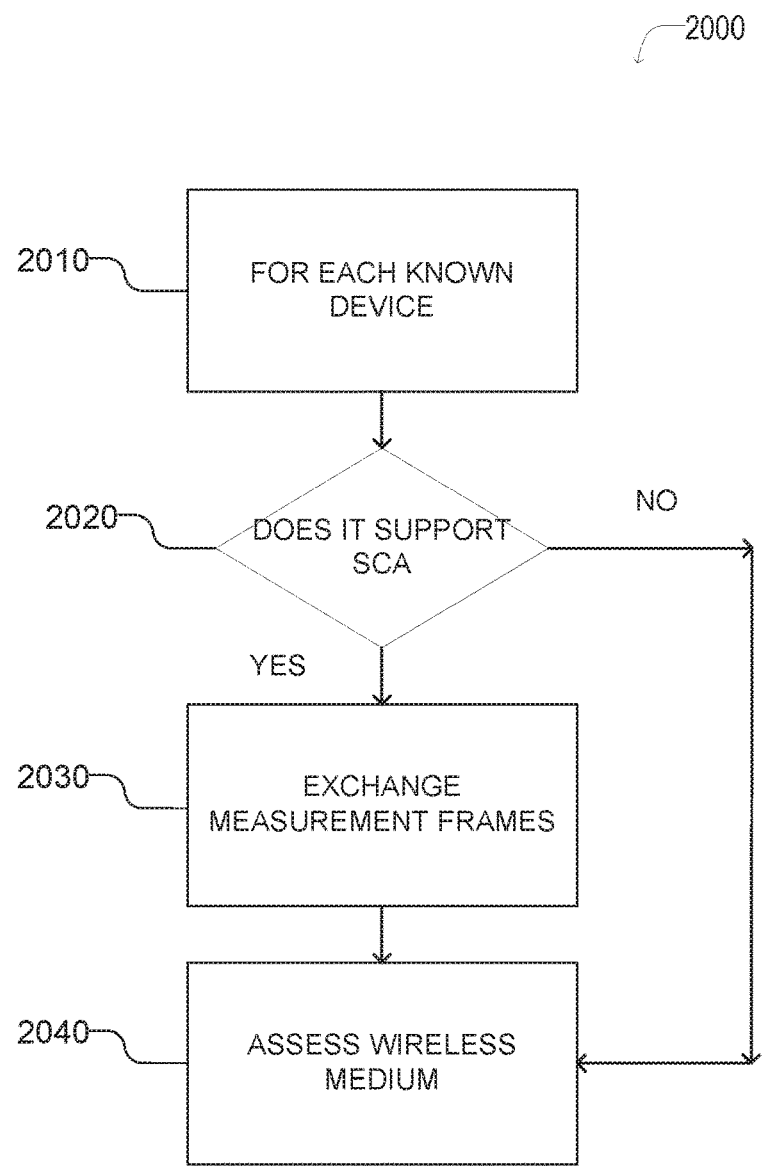
FIG. 2 is a flowchart of a method of network analysis according to some examples of the present disclosure.

FIG. 2 shows a flowchart of a method of network analysis for use in determining transmission parameters of SCA transmissions 2000 according to some examples of the present disclosure. For each device on the medium 2010 that is not in the node's current network, at operation 2020 a determination is made as to whether or not the device supports SCA. For example, an Access Point may advertise the capability to support SCA in a beacon or probe response. SCA nodes may advertise they are capable of SCA in an association request with the network. In other examples, an SCA capable node may determine if another SCA station supports SCA by sending unsolicited SCA measurement request messages. If the receiver of the SCA measurement responds, then it can be assumed that it supports SCA. In other examples, a node may determine other nodes that support SCA by observing SCA related frames (measurements/agreements) transmitted by the other nodes.

If it is determined that the device does not support SCA the wireless medium is estimated at operation 2040 (e.g., a path loss is estimated) using messages overheard from that node on the wireless medium. If the device supports SCA, the devices may exchange measurement frames 2030 and use those measurement frames at operation 2040 to assess the wireless medium (e.g., calculate a path loss).

Open loop measurements without using measurement frames assume channel reciprocity. The SCA enabled device measures transmissions received from the non-SCA enabled devices and assumes that a transmission from the SCA enabled device to those devices would have the same characteristics (e.g., multipath, fading, power level, etc . . . ) as those received messages. While this estimation may not completely accurate, it may be accurate enough for setting SCA transmission parameters. In some examples, the most accurate estimations of the non-SCA enabled devices may be obtained by measuring control frames, such as beacon frames, which are sent at the maximum transmission power. Control frames may be preferred in some examples as other packets (such as data frames) may not be sent at the maximum transmission power and thus the estimation may produce transmission characteristics (e.g., transmission power) for the SCA transmission which are not accurate and which may cause interference with the PCA transmission.

SCA transmission parameters may be calculated using the assessment calculated at operation 2040 to ensure that the SCA transmission is heard at the PCA receiver at a power level below the noise floor (e.g., around −95 dBm). The SCA transmission must also be powerful enough to be heard at the SCA receiver. To ensure that the SCA transmission is heard at the SCA receiver, measurements of the wireless medium between the sender and the receiver may be necessary using the same techniques disclosed for measuring the medium between the SCA node and the PCA nodes. Example transmission parameters calculated include one or more of transmission power, beamforming parameters, Multiple Input Multiple Output (MIMO) parameters (including Multiple User MIMO parameters), bit rate, timing parameters, modulation and coding schemes, and the like.

In order for the other node of the SCA transmission to receive the SCA transmission, the receiving node must be ready to receive the message. For example, when the SCA receiver senses the PCA transmission, many times the SCA receiver will continue to receive the PCA frame and then discard it. In order to receive the SCA transmission, the SCA receiver must be ready to receive it. In some examples, the SCA transmitter and the SCA receiver agree ahead of time that the SCA transmission will take place.

Figure 3:
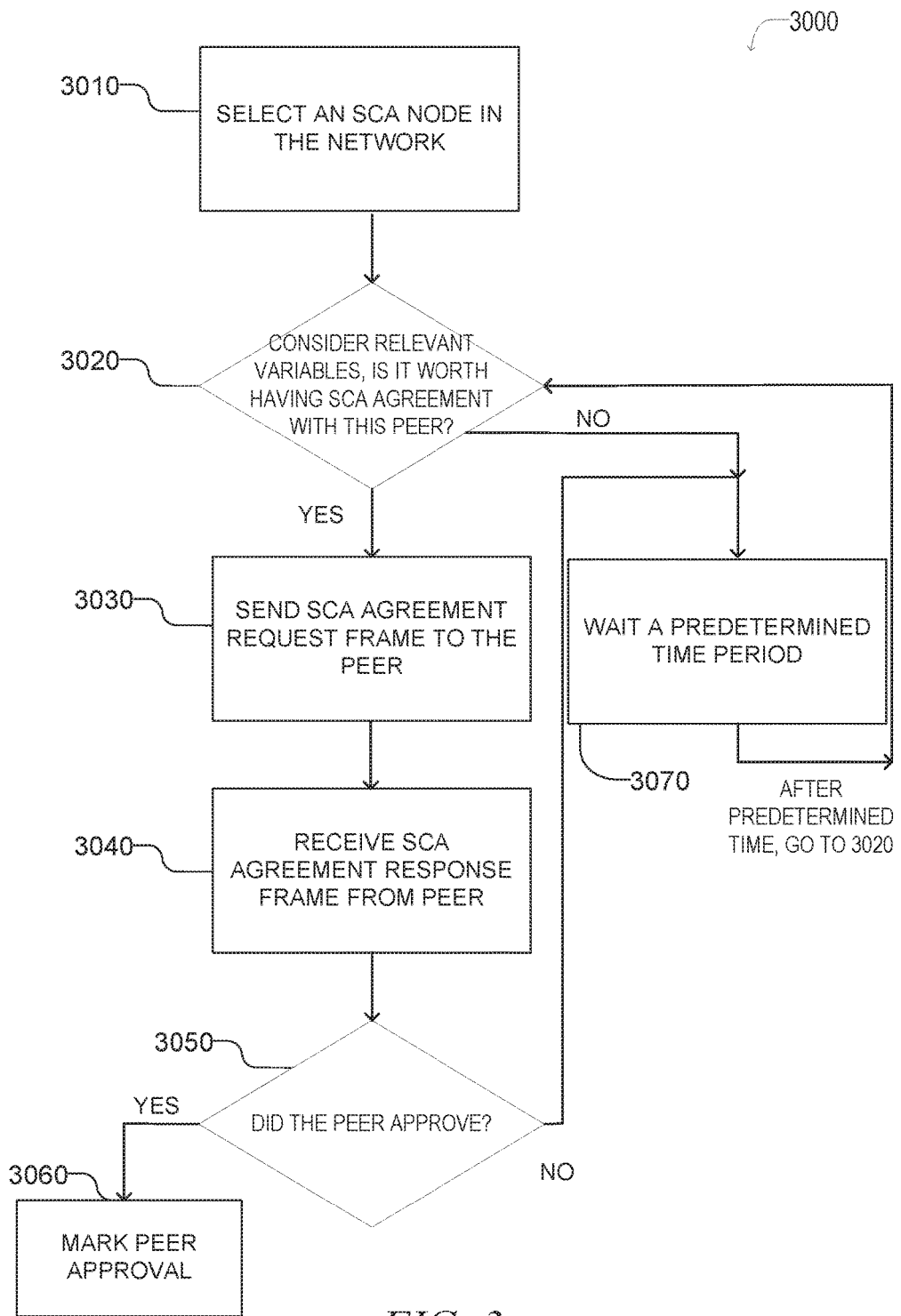
FIG. 3 is a flowchart of a method of peer negotiation according to some examples of the present disclosure.

FIG. 3 shows a flowchart of a method 3000 of peer negotiation between two SCA capable nodes according to some examples of the present disclosure. At operation 3010 a node that supports SCA on the wireless network is selected. At operation 3020 a decision is made as to whether it is desirable to have an SCA agreement with the node. Considerations may include properties of the wireless medium such as the amount of congestion on the medium, the likelihood that the data could be sent promptly with a PCA transmission, the amount of SCA traffic already on the wireless medium, and the like. The decision may also factor in the medium between the nodes—e.g., if the power level would have to be too low given the path loss of the adjacent PCA transmissions to effectively reach the SCA peer, there may be no reason to send an SCA transmission. Other considerations include whether or not there is any data to send, how much data is to be sent, and if the data could wait until a PCA transmission opportunity is available. If it is not worth it at this time to have an agreement, the node may wait a predetermined amount of time at operation 3070 and try again once that time has elapsed. In other examples, other re-evaluation triggers may be utilized. For example, if the wireless conditions change, it may become worth it to have a peer agreement with a particular SCA node whereas before it was not. If it is worth it to have an agreement, the node sends an SCA agreement request to the peer at operation 3030. At operation 3040 the response is received from the peer. The status of the reply is checked at operation 3050 and if the peer approved at operation 3060, the node stores the agreement. If the peer did not approve the node may wait for a predetermined amount of time at operation 3070. Once the predetermined period of time has expired, the node may re-evaluate whether it is worth having an SCA agreement at operation 3020.

The SCA agreement may specify the parameters for when and how the SCA transmissions are to be received and transmitted between the SCA peers. These agreements may be refreshed periodically to adapt the agreement to changing wireless conditions. Example agreements may specify the time of the SCA transmissions. This time may be specified in a variety of ways. For example, an absolute time (e.g., "at 4:30 pm"), a reference to a specific PCA transmission (e.g., based on the sender/receiver of the PCA transmission), a reference to a generic PCA transmission (e.g., "the next 3 PCA transmissions," "every other PCA transmission for the next 4 PCA transmissions," "the first PCA transmission that lasts longer than a predetermined amount"), a general agreement that the sender may transmit to the receiver on any PCA transmission, or the like. The SCA receiver may grant the request, deny the request, or the like. In some examples the SCA receiver may communicate to the SCA sender in the agreement acceptance one or more relevant wireless parameters observed at the SCA receiver for nodes involved in the PCA transmission. For example, a path loss between the sender of the PCA transmission and the SCA receiver. In some examples, this may be utilized in later calculations of the SCA transmission parameters. This path loss will determine the noise level and/or signal to noise ratio at the SCA receiver. In some examples, the agreement may be unidirectional from node A to node B, but in other examples, the agreement may be bi-directional, allowing node B to send to node A. In some examples, the agreement may include multiple SCA parameters. For example, the agreement may specify multiple sending SCA nodes, multiple receiver SCA nodes (e.g., the agreement may be the result of an Access Point dynamically assigning SCA transmissions), and multiple PCA nodes.

In some examples, the SCA transmission may be between two STA. In other examples, the SCA transmission may be between a STA and an AP. As used herein, a node refers to any device in the wireless network (e.g., an AP or a STA). The SCA transmission may be a uni-cast message, but in other cases the SCA transmission may be a multi-cast or broadcast transmission. In the case of multi-cast or broadcast SCA transmissions, the SCA logic may have to consider many different nodes to ensure reception by intended recipients without interference with PCA transmissions.

Figure 4:
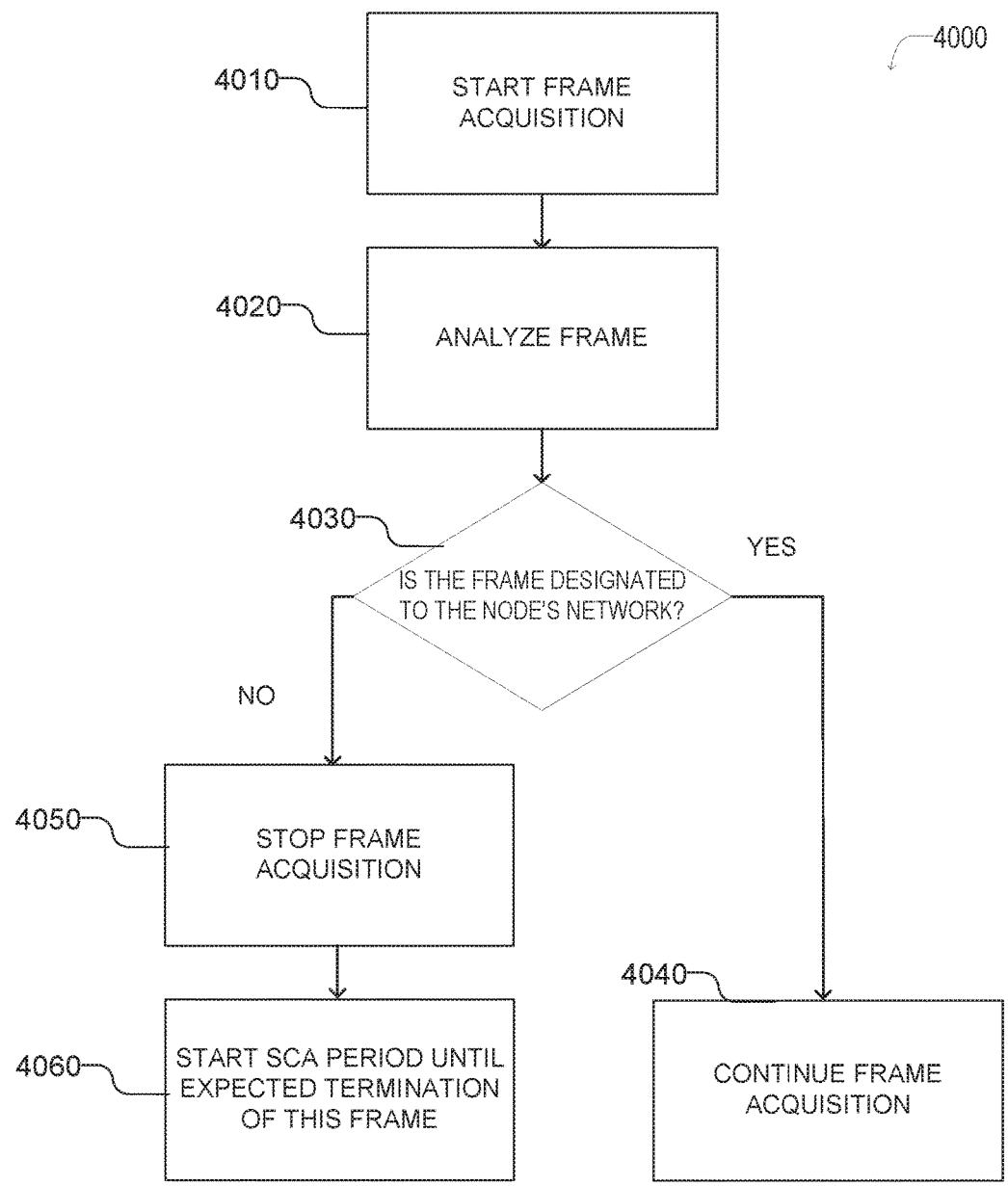
FIG. 4 is a flowchart of a method of starting an SCA period according to some examples of the present disclosure.

FIG. 4 shows a flowchart of a method 4000 of starting an SCA period according to some examples of the present disclosure. At operation 4010 the SCA enabled node starts a frame acquisition. This frame may be sent from any of the other nodes on the medium, including nodes in the acquiring node's network. At operation 4020 the frame is analyzed. In some examples, this operation analyzes the Physical Layer Convergence Protocol (PLCP) and Medium Access Control (MAC) headers. Based upon this analysis, at operation 4030 a determination is made whether the frame is for the node's current network. If it is for the current network, the frame acquisition is continued at operation 4040. If the frame is for another network, at operation 4050, the node may stop frame acquisition. At operation 4060 the node may begin the SCA period, which will continue until the PCA packet transmission is complete. The SCA period may be determined from the length and other fields in the Physical Layer Convergence Protocol (PLCP) and Medium Access Control (MAC) headers. The SCA period length may also be determined based upon the NAV mechanism of 802.11. For example, SCA nodes may observe Request to Send (RTS) and Clear to Send (CTS) exchanges between nodes engaging in the PCA. The RTS/CTS exchange may include a duration field that protects several frame transmissions. In such a scenario, it is possible to have an SCA period for the entire duration field. In these examples, the SCA nodes may have to consider both the PCA transmitter and receiver in determining the SCA transmission parameters as the RTS/CTS exchange may have data packet transfers that are bi-directional.

While in some examples, an SCA transmission may only be done if the PCA transmission is for a different network than the SCA transmission, in other examples, the SCA transmission may be on the same network as the PCA transmission. For example, if the PCA transmission is between a node and an AP and the SCA transmission is peer-to-peer and the requirements for not interfering with the PCA transmission are met.

Figure 5:
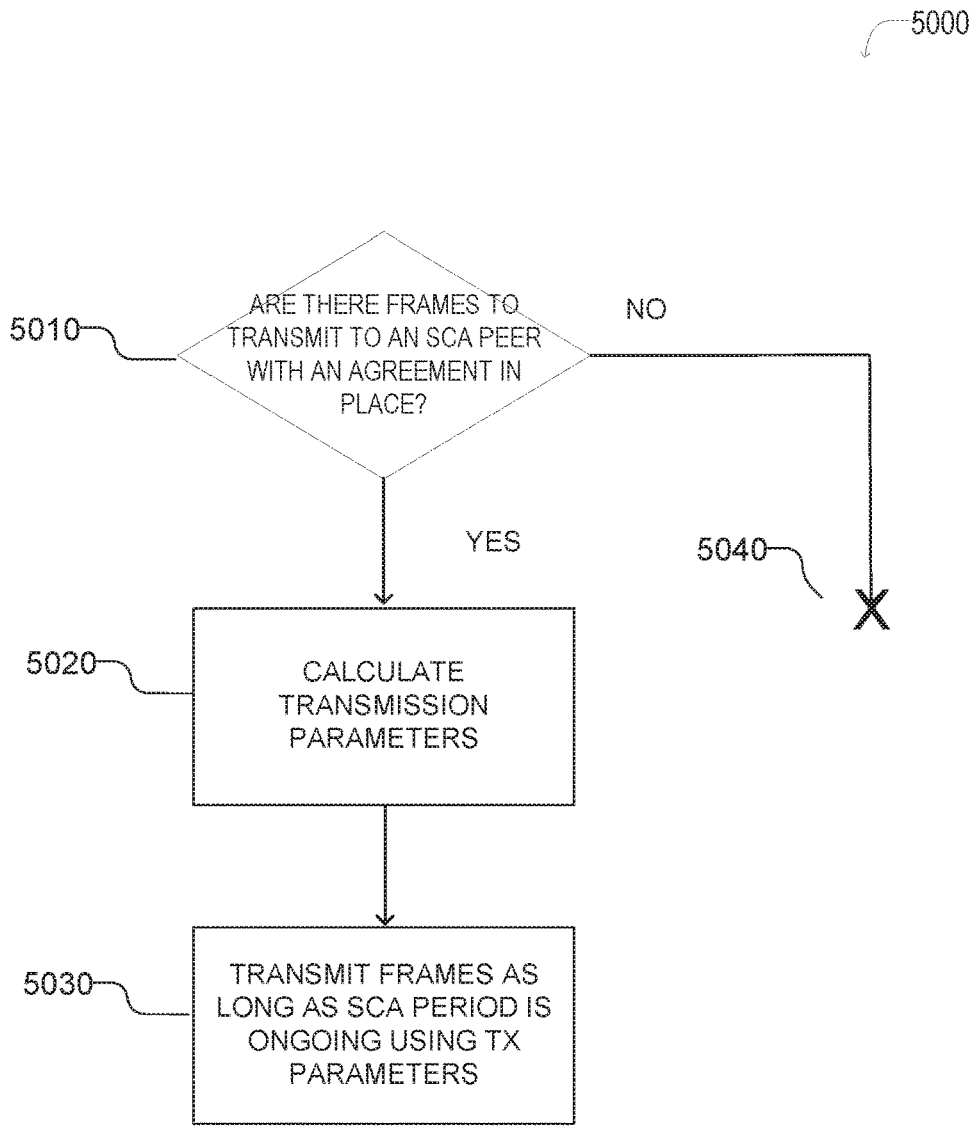
FIG. 5 is a flowchart of a method of transmitting using SCA during the SCA period according to some examples of the present disclosure.

One the SCA period is ongoing, the SCA node may transmit frames (FIG. 5) or receive frames (FIG. 7) or both over the SCA depending on the SCA peer agreements and whether or not the SCA node has packets to transmit. FIG. 5 shows a flowchart of a method 5000 of transmitting using SCA during the SCA period (as determined by FIG. 4) according to some examples of the present disclosure. In some examples, the same channel access mechanisms (e.g., Distributed Coordination Function (DCF), Enhanced Distributed Channel Access (EDCA), and other mechanisms) utilized for PCA transmissions may be utilized on the SCA to ensure a clear SCA medium. In other examples, the SCA agreements may specify which transmissions are allowed at which times on the SCA, and thus the SCA transmitter may assume that the SCA transmission is allowed (e.g., other SCA transmissions that would interfere will not occur). At operation 5010 if the SCA node has no frames to transmit or no agreements to transmit to an SCA peer, the node may resume normal operations at 5040 (or in other examples, may receive SCA frames if there is an agreement to do so). At operation 5010 if the SCA node does have frames to transmit and an agreement with the destination node (or if the SCA medium is free in some examples) at operation

5020 the SCA transmission parameters may be calculated. Example, transmission parameters include a maximum transmission power (which is based upon the PCA nodes participating in the transmission of the PCA), an appropriate transmission rate, and the like. At operation 5030 the SCA frames are transmitted as long as the SCA period has not expired (e.g., the PCA medium becomes free) using the transmission parameters determined for the current SCA period and the rate determined at operation 5020. The SCA transmitter node may also receive acknowledgement packets from the SCA receiver node and transmit any retransmissions necessary based upon those acknowledgement packets.

Figure 6:
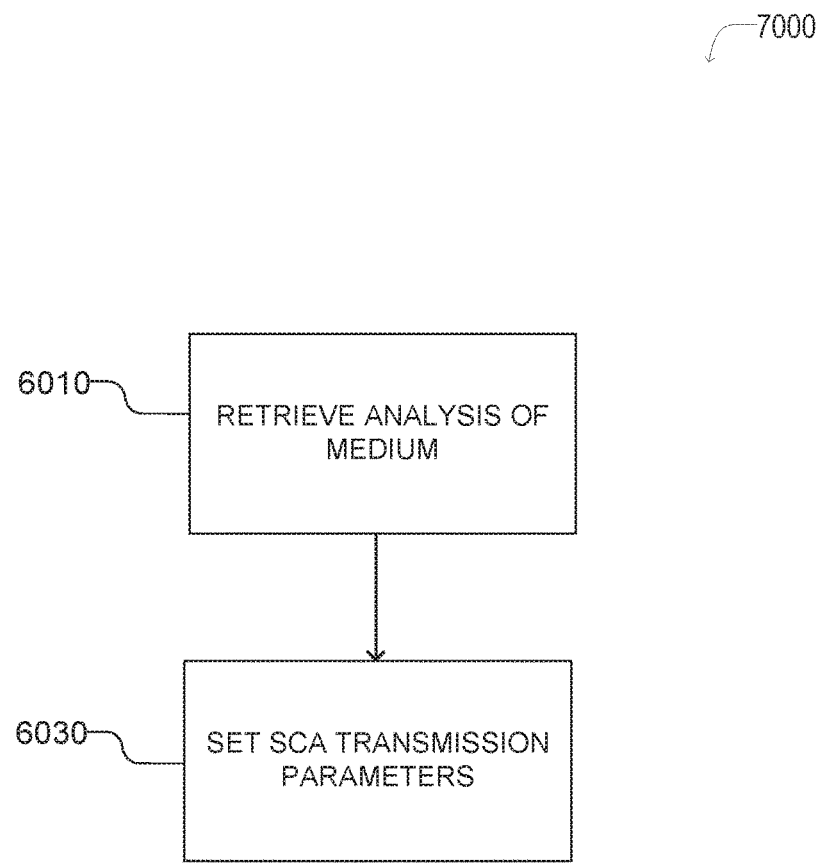
FIG. 6 is a flowchart of a method of calculating SCA transmission parameters according to some examples of the present disclosure.

FIG. 6 shows a flowchart of a method of calculating transmission parameters (e.g., a TX Power, TX Rate) for SCA transmissions according to some examples of the present disclosure. At operation 6010 the measurements of the wireless medium (e.g., an estimated path loss) are retrieved (e.g., the results of the assessment of the wireless medium done at operation 2040 from FIG. 2). At operation 6020 the SCA transmission parameters (e.g., a maximal transmission power) for the SCA period are calculated. Example transmission parameters may include a transmission power. In some examples, the transmission power may be set to be −95 dBm added to a calculated path loss for the wireless medium between the SCA transmitting node and the PCA receiving node. Other transmission parameters include a transmission rate, which may be based upon the wireless medium between the SCA transmitter and SCA receiver.

Figure 7:
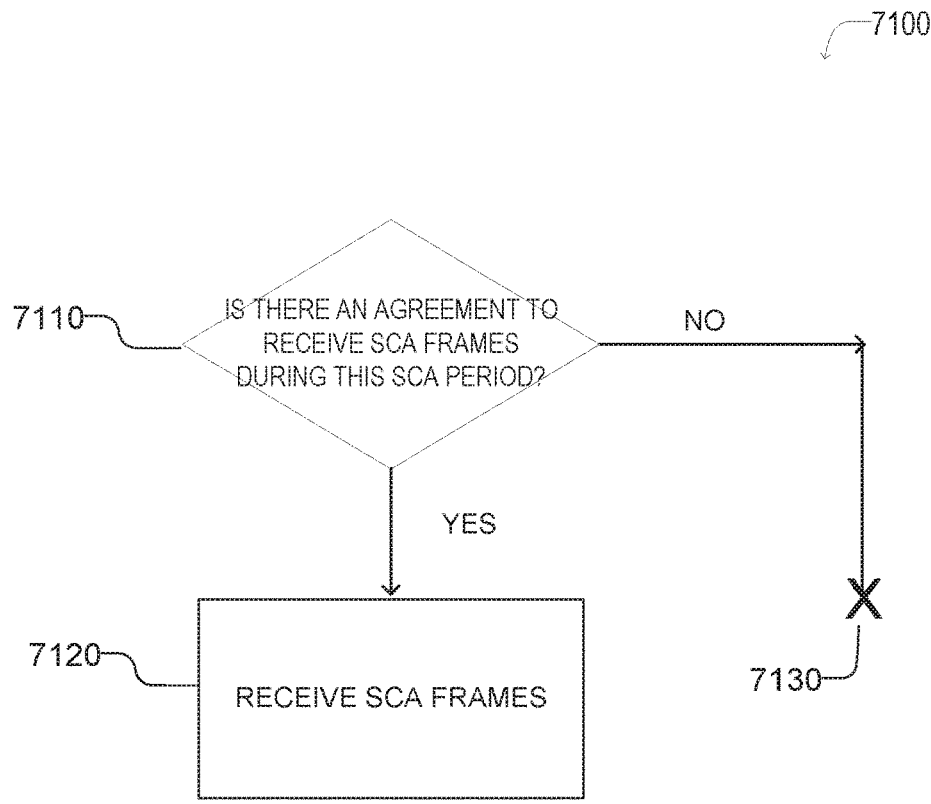
FIG. 7 is a flowchart of a method of receiving an SCA transmission during the SCA period according to some examples of the present disclosure.

FIG. 7 is a flowchart of a method 7100 of receiving an SCA transmission during the SCA period (as determined from FIG. 4) according to some examples of the present disclosure. At operation 7110 the node determines whether or not there is an agreement to receive SCA frames during the current SCA period. If the node is not in an agreement to receive SCA frames during the current SCA period, the node may continue its normal operations at 7130. If the node is in an agreement to receive frames, the node may receive those frames at operation 7120. The node receiving the SCA frames may transmit any acknowledgements (ACK) required. In some examples, the ACK power may be specified by the transmitting node of the SCA transmission, for example in the SCA agreement or in higher layer protocols (e.g., a MAC layer or higher). In other examples, the ACK power is set the same way that an SCA transmission would be set (e.g., based on an analysis of the wireless medium such as was done in FIG. 6). In still other examples, the receiving node of the SCA transmission may observe the reduction in received signal strength (RSSI) between the SCA packet and what a normal PCA packet RSSI would be and reduce the acknowledgement transmit power by the same amount.

In some examples, a node may both transmit data packets and receive data packets within the same SCA period. In these examples, the transmission and reception (and whether or not the node transmits first or receives first) may be determined by the agreements with the SCA peers. Furthermore, in some examples, a node may only transmit (but not receive, with the exception of acknowledgements) or only receive (but not transmit, with the exception of acknowledgements) within a single SCA period—thus a node may not make an agreement to receive SCA frames after it has already agreed to transmit SCA frames for the same SCA period.

One example application of the SCA concept may be in Wireless Display (WiDi) technologies. WiDi enables users to stream music, movies, photos, videos and apps wirelessly from a compatible computing device to a WiDi enabled television. In this example, a general SCA agreement between the computing device and the television may be made by higher application level layers (eliminating the need to add additional 802.11 messages to the 802.11 standard in some examples). For example, the WiDi transmitter and the WiDi receiver may agree to exchange frames on every SCA period. Thus streaming data may be sent over the PCA when possible, but when the medium is busy, the WiDi nodes may agree to automatically transition to SCA transmissions to reduce the chances that streaming may be interrupted.

Figure 8:
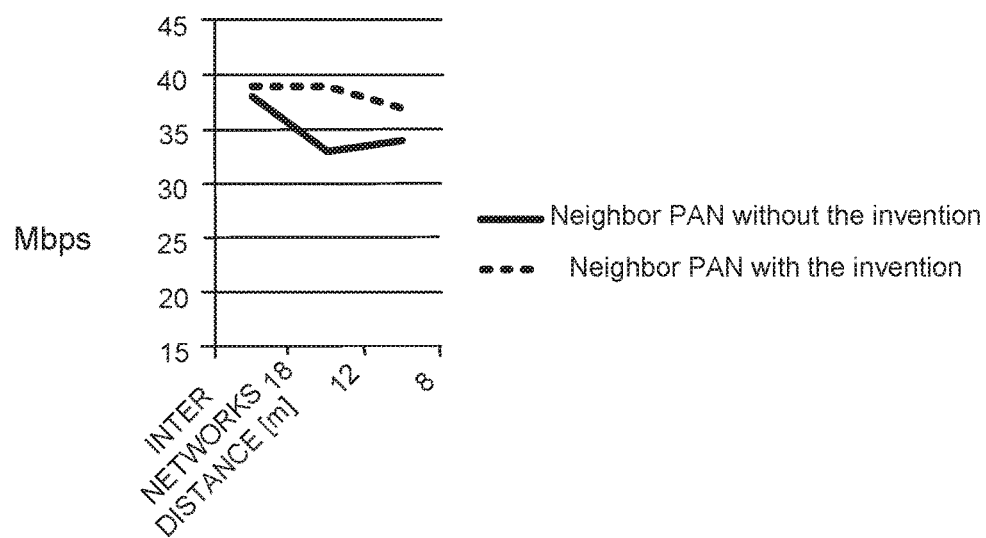
FIG. 8 is a graph of results of using the SCA of the present disclosure.
Figure 9:
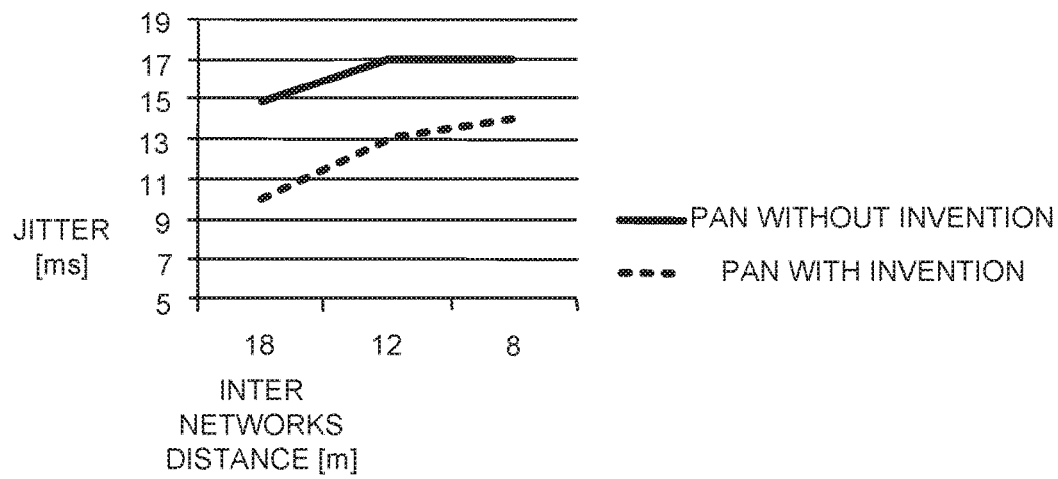
FIG. 9 is a graph of results of using the SCA of the present disclosure.

The present disclosure thus proposes a solution that increases the total capacity of the network by allowing concurrent frame transmission. As a result, the performance of networks implementing the solution disclosed herein will always be equal to or higher than current solutions. FIGS. 8 and 9 show measurements of the performance of devices using the invention in the presence of another network that does not use the invention and uses the same channel. The results showed performance improvement in terms of jitter and throughput both in the network using the invention and the co-network without the invention depending on the characteristics of the applications being used. FIGS. 8 and 9 shows the jitter improvement of a Personal Area Network (PAN) transferring constant bitrate of 20 Mbps (simulating video traffic) using the same channel as another BSS, which transfers data at its maximal rate (simulating Best Effort traffic). The BSS TPT increased by up to 18% whereas the PAN jitter decreased by up to 33%.

While reference was made herein to 802.11 networks, one of ordinary skill in the art with the benefit of Applicants' disclosure will appreciate that the same principles disclosed herein may be applicable to other wireless technologies such as Long Term Evolution (LTE), Wi-Max (802.16), Bluetooth and the like. In addition, while the disclosure herein contemplated two interfering networks of the same type, the disclosure herein is applicable to two interfering networks of different types (e.g., a Wi-Fi and Bluetooth network for example).

Figure 10:
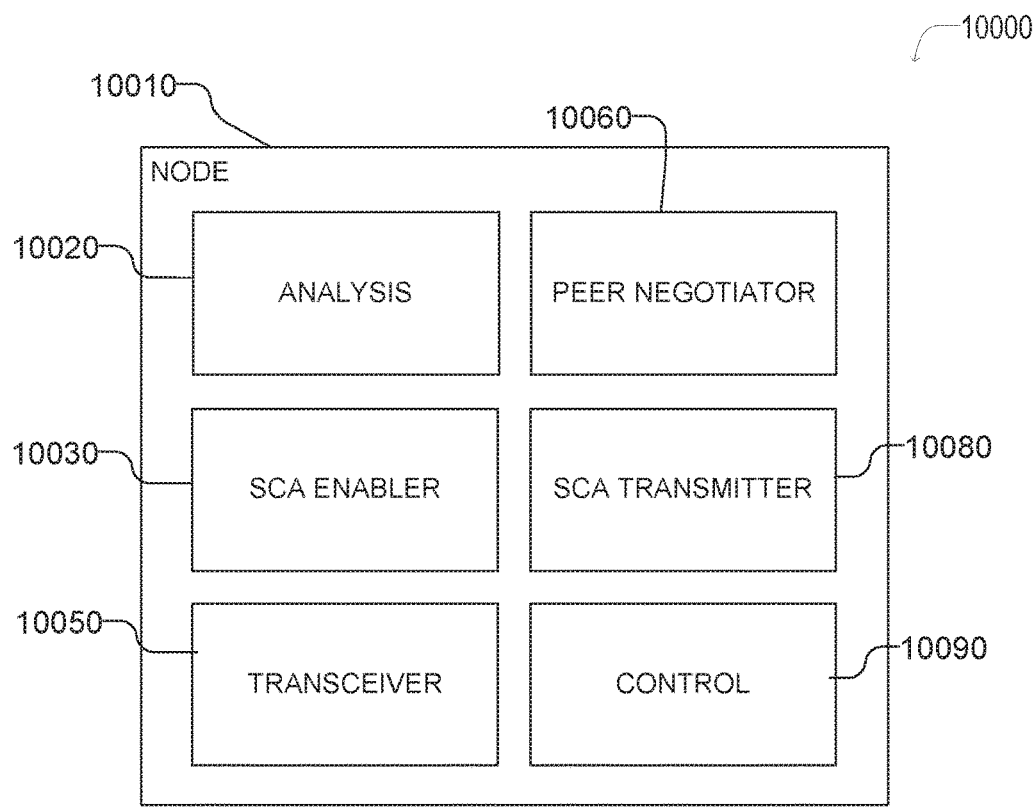
FIG. 10 is a schematic of a wireless node according to some examples of the present disclosure.

FIG. 10 shows an example schematic of a node 10010 in a wireless network according to some examples of the present disclosure. The node may be an access point (AP), a station (STA) or the like. The node may contain any one or more of the hardware components of FIG. 11. For example, the modules described in FIG. 10 may execute on the processor 11002, be stored in the machine readable medium 11022 or the like.

Analysis module 10020 may sense other wireless devices present on the medium and determine which of those devices support SCA. For those devices that support SCA the analysis module uses transceiver module 10050 to exchange measurement frames to determine characteristics of the wireless medium between the nodes (e.g., a path loss). For those that do not support SCA the analysis module 10020 determines the characteristics based upon one or more overheard messages sent from the other node. The Analysis module 10070 may utilize the determined characteristics of the wireless medium (e.g., path loss) to calculate the transmission parameters (e.g., a TX power, a TX rate, and the like) for an SCA transmission.

Peer negotiator module 10060 may determine periodically whether it is advantageous to enter into a peer agreement with another SCA node. If the negotiator module 10060 determines that it is advantageous, then the Peer negotiator module 10060 may utilize transceiver 10050 to setup these agreements.

SCA enabler module 10030 may determine whether frames received through a transceiver module 10050 are designated to be the node 10010's network or another network and if the frames are designated to another network, to initiate the SCA period. The enabler module may determine the length of the SCA period based upon various information in the received frame from the PCA (e.g., message length, Modulation and Coding Schemes (MCS) and the like).

The SCA transmitter module 10080 may determine if there are frames to transmit in the SCA period to an SCA peer with which the node 10010 has an SCA agreement with. If there are such frames, the SCA transmitter 10080 may utilize transceiver 10050 to send those frames as long as the SCA period has not expired utilizing the determined transmission parameters.

The transceiver 10050 may send and receive frames over the wireless medium as well as sense the status of the medium. The control module 10090 may direct the other modules of the node 10010 in the implementation of the SCA functionality. FIG. 10 is one non-limiting example of a node, all or part of the functionality described as being performed by any one of the modules in FIG. 10 may be performed by any one or more other modules.

Figure 11:
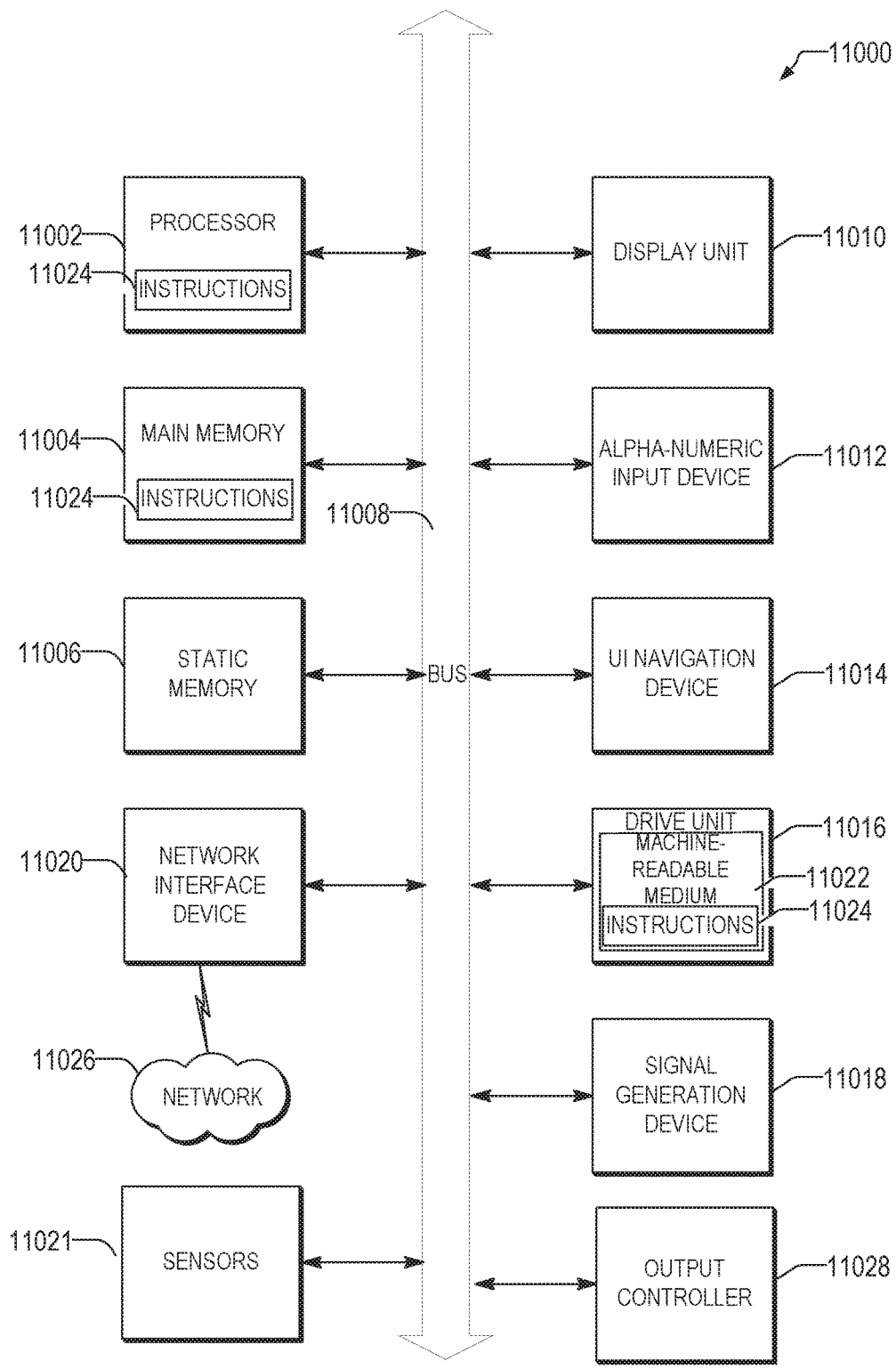
FIG. 11 is a schematic of a machine according to some examples of the present disclosure.

FIG. 11 illustrates a block diagram of an example machine 11000 upon which any one or more of the techniques (e.g., methodologies) discussed herein may perform. In alternative embodiments, the machine 11000 may operate as a standalone device or may be connected (e.g., networked) to other machines. In a networked deployment, the machine 11000 may operate in the capacity of a server machine, a client machine, or both in server-client network environments. In an example, the machine 11000 may act as a peer machine in peer-to-peer (P2P) (or other distributed) network environment. The machine 11000 may be a personal computer (PC), a tablet PC, a set-top box (STB), a personal digital assistant (PDA), a mobile telephone, a web appliance, a network router, switch or bridge, an Access Point (AP), a Station (STA), or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 11000 may include a hardware processor 11002 (e.g., a central processing unit (CPU), a graphics processing unit (GPU), a hardware processor core, or any combination thereof), a main memory 11004 and a static memory 11006, some or all of which may communicate with each other via an interlink (e.g., bus) 11008. The machine 11000 may further include a display unit 11010, an alphanumeric input device 11012 (e.g., a keyboard), and a user interface (UI) navigation device 11014 (e.g., a mouse). In an example, the display unit 11010, input device 11012 and Iii navigation device 11014 may be a touch screen display. The machine 11000 may additionally include a storage device (e.g., drive unit) 11016, a signal generation device 11018 (e.g., a speaker), a network interface device 11020, and one or more sensors 11021, such as a global positioning system (GPS) sensor, compass, accelerometer, or other sensor. The machine 11000 may include an output controller 11028, such as a serial (e.g., universal serial bus (USB), parallel, or other wired or wireless (e.g., infrared (IR), near field communication (NEC), etc.) connection to communicate or control one or more peripheral devices (e.g., a printer, card reader, etc.).

The storage device 11016 may include a machine readable medium 11022 on which is stored one or more sets of data structures or instructions 11024 (e.g., software) embodying or utilized by any one or more of the techniques or functions described herein. The instructions 11024 may also reside, completely or at least partially, within the main memory 11004, within static memory 11006, or within the hardware processor 11002 during execution thereof by the machine 11000. In an example, one or any combination of the hardware processor 11002, the main memory 11004, the static memory 11006, or the storage device 11016 may constitute machine readable media.

While the machine readable medium 11022 is illustrated as a single medium, the term "machine readable medium" may include a single medium or multiple media (e.g., a centralized or distributed database, and/or associated caches and servers) configured to store the one or more instructions 11024.

The term "machine readable medium" may include any medium that is capable of storing, encoding, or carrying instructions for execution by the machine 11000 and that cause the machine 11000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 11024 may further be transmitted or received over a communications network 11026 using a transmission medium via the network interface device 11020. The Machine 11000 may communicate with one or more other machines using one or more networks. Machine 11000 may utilize any one or more of a number of communication and network protocols implemented in some examples by one or more of the components of machine 11000 including the network interface device 11020. Examples include a frame relay, internet protocol (IP), transmission control protocol (TCP), user datagram protocol (UDP), hypertext transfer protocol (HTTP), protocols relating to local area networks (LAN), wide area networks (WAN), packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 11020 may include one or more physical jacks (e.g., Ethernet, coaxial, or phone jacks) or one or more antennas to connect to the communications network 11026. In an example, the network interface device 11020 may include a plurality of antennas to wirelessly communicate using at least one of single-input multiple-output (SIMO), multiple-input multiple-output (MIMO), or multiple-input single-output (MISO) techniques. In some examples, the network interface device 11020 and/or other components of machine 11000 may wirelessly communicate using Multiple User MIMO techniques. Network interface device 11020 and/or other components of machine 11000 may modulate and demodulate packets utilizing Orthogonal Frequency Division Multiplexing (OFDM) techniques and may implement one or more network protocol layers such as a Medium Access Control layer (MAC layer) a Physical Layer (PHY) and the like.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

OTHER NOTES AND EXAMPLES

The following are non-limiting example embodiments.

Example 1 includes subject matter (such as a method, means for performing acts, machine readable medium including instructions when performed by a machine cause the machine to perform acts, or an apparatus configured to perform) performed by a node in a first wireless network comprising: receiving a first frame over a wireless medium designated to a second wireless network; responsive to receiving the first frame designated to the second wireless network, while the wireless medium is still occupied by activity occurring on the second wireless network: calculating transmission parameters to send a second frame to a second node in the first wireless network by calculating that the selected parameters result in a third node that is the recipient of the first frame receiving the second frame at a power level that is below a noise threshold; and transmitting the second frame to the second node using the calculated transmission parameters.

In example 2, the subject matter of example 1 may optionally include wherein the transmission parameters are calculated based upon measurement messages exchanged between the node and the third node.

In example 3, the subject matter of any one or more of examples 1-2 may optionally include wherein the transmission parameters are calculated based upon an overheard message sent by the third node.

In example 4, the subject matter of any one or more of example 1-3 may optionally include wherein the overheard message is a control message.

In example 5, the subject matter of any one or more of example 1-4 may optionally include sending an agreement message to the second node; receiving a reply from the second node; determining that the reply from the second node indicates that the second node agrees to receive the transmission; responsive to determining that the reply from the second node indicates that the second node agrees to receive the transmission, transmitting the second frame according to the agreement.

In example 6, the subject matter of any one or more of example 1-5 may optionally include wherein the agreement message is sent periodically according to a predetermined amount of time.

In example 7, the subject matter of any one or more of example 1-6 may optionally include wherein receiving a first frame over a wireless medium designated to a second wireless network comprises: receiving the first frame; decoding at least one of: Physical Layer Convergence Protocol (PLCP) and Medium Access Control (MAC) headers; determining that the at least one of the PLCP and MAC headers indicates that the first frame is designated to the second wireless network.

In example 8, the subject matter of any one or more of example 1-7 may optionally include wherein the first wireless network operates in accordance with an IEEE 802.11 standard.

Example 9 includes or may optionally be combined with the subject matter of any one of example 1-8 to include subject matter (such as a device, apparatus, or machine) comprising a device for communicating in a wireless network comprising: a transceiver module configured to receive a first frame over a wireless medium designated to a second wireless network; an analysis module configured to: calculate, in response to receiving the first frame designated to the second wireless network, while the wireless medium is still occupied by activity occurring on the second wireless network, transmission parameters to send a second frame to a second node in the first wireless network by calculating that the selected parameters result in a third node that is the recipient of the first frame receiving the second frame at a power level that is below a noise threshold; and wherein the transceiver is configured to send the second frame to the second node using the calculated transmission parameters.

In example 10, the subject matter of any one or more of example 1-9 may optionally include wherein the node is an Access Point (AP).

In example 11, the subject matter of any one or more of example 1-10 may optionally include wherein the node is a Station (STA).

In example 12, the subject matter of any one or more of example 1-11 may optionally include wherein the analysis module is configured to calculate the transmission parameters based upon measurement messages exchanged between the node and the third node.

In example 13, the subject matter of any one or more of example 1-12 may optionally include wherein the analysis module is configured to calculate the transmission parameters based upon an overheard message sent by the third node.

In example 14, the subject matter of any one or more of example 1-13 may optionally include wherein the overheard message is a control message.

In example 15, the subject matter of any one or more of example 1-14 may optionally include wherein the first wireless network operates in accordance with an IEEE 802.11 standard.

In example 16, the subject matter of any one or more of example 1-15 may optionally include wherein the analysis module is configured to determine the activity on the second wireless network based upon an overheard request to send and corresponding clear-to-send message on the second wireless network.

What is claimed is:

1. An apparatus of a station (STA) configured to operate in a wireless local area network (WLAN) comprising a basic service set (BSS), the BSS including at least the STA and an access point (AP), the apparatus comprising: memory; and processing circuitry, configured to:
   detect a frame from an overlapping WLAN;
   determine from the detected frame if simultaneous channel access is allowed;
   determine a duration of channel access from the detected frame;
   if simultaneous channel access is allowed, adjust transmission parameters including a transmit power level to reduce interference with the overlapping WLAN, the processing circuitry is to adjust the transmission parameters based on signaling previously received from the AP; and
   cause the STA to transmit a second frame to the AP during the duration of the detected frame, the second frame transmitted on a same channel as the detected frame,
   wherein in response to detection of the frame from the overlapping WLAN indicating that simultaneous channel access is allowed, the processing circuitry is further configured to:
   discontinue acquisition of the detected frame; and
   start a simultaneous channel access period for restriction of transmit power for the duration,
      wherein the processing circuitry is to cause the STA to transmit the second frame to the AP during the simultaneous channel access period.

2. The apparatus of claim 1, wherein the processing circuitry is further configured to determine if a power level of the detected frame is below a predetermined threshold, and
   cause the STA to transmit the second frame to the AP during the duration if the power level of the received frame is below the predetermined threshold.

3. The apparatus of claim 1 wherein the processing circuitry is configured to adjust the transmit power level for transmission of the second frame to be below a detection level of the overlapping WLAN.

4. The apparatus of claim 1 wherein the signaling previously received from the AP is a beacon.

5. The apparatus of claim 1, wherein the processing circuitry is configured to refrain from updating a network allocation vector (NAV) of the STA upon detection of the frame from the overlapping WLAN when the detected frame indicates that simultaneous channel access is allowed and when the power level of the detected frame is below a predetermined threshold.

6. The apparatus of claim 1, wherein the processing circuitry is further configured to decode signaling from the AP prior to detection of the frame from the overlapping WLAN, the processing circuitry to adjust the transmission parameters for simultaneous channel access based on the signaling.

7. The apparatus of claim 1 wherein the overlapping WLAN is an overlapping BSS,
   wherein simultaneous channel access comprises a spatial reuse, and
   wherein the overlapping BSS uses the same channel as the BSS of the STA.

8. The apparatus of claim 1 wherein the memory is configured to store the second frame.

9. The apparatus of claim 1 further comprising transceiver circuitry coupled to a plurality of antennas.

10. A method performed by a station (STA) configured to operate in a wireless local area network (WLAN) comprising a basic service set (BSS), the BSS including at least the STA and an access point (AP), the method comprising:
  detecting a frame from an overlapping WLAN, the overlapping WLAN using a same channel as the BSS of the STA;
  determining from the detected frame if simultaneous channel access is allowed;
  determining a duration of channel access from the detected frame;
  if simultaneous channel access is allowed, adjusting transmission parameters including a transmit power level to reduce interference with the overlapping WLAN, wherein adjusting transmission parameters comprises adjusting the transmission parameters based on signaling previously received from the AP; and
  configuring the STA to transmit a second frame to the AP during the duration of the detected frame, the second frame transmitted on the same channel as the detected frame,
  wherein in response to detection of the frame from the overlapping WLAN indicating that simultaneous channel access is allowed, the method further comprises:
  discontinuing acquisition of the detected frame; and
  starting a simultaneous channel access period for restriction of transmit power for the duration,
  wherein the method comprises transmission of the second frame to the AP during the simultaneous channel access period.

11. The method of claim 10 further comprising:
  determining if a power level of the detected frame is below a predetermined threshold; and
  causing the STA to transmit the second frame to the AP during the duration if the power level of the received frame is below the predetermined threshold.

12. The method of claim 10 further comprising adjusting the transmit power level for transmission of the second frame to be below a detection level of the overlapping WLAN.

13. The method of claim 10 further comprising refraining from updating a network allocation vector (NAV) of the STA upon detection of the frame from the overlapping WLAN when the detected frame indicates that simultaneous channel access is allowed and when the power level of the detected frame is below a predetermined threshold.

14. A non-transitory computer-readable storage medium that stores instructions for execution by processing circuitry of a station (STA), the STA configured to operate in a wireless local area network (WLAN) comprising a basic service set (BSS), the BSS including at least the STA and an access point (AP), the processing circuitry configured to:
  detect a frame from an overlapping WLAN;
  determine from the detected frame if simultaneous channel access is allowed;
  determine a duration of channel access from the detected frame;
  if simultaneous channel access is allowed, adjust transmission parameters including a transmit power level to reduce interference with the overlapping WLAN, the processing circuitry to adjust the transmission parameters based on signaling previously received from the AP; and
  cause the STA to transmit a second frame to the AP during the duration of the detected frame, the second frame transmitted on a same channel as the detected frame,
  wherein in response to detection of the frame from the overlapping WLAN indicating that simultaneous channel access is allowed, the processing circuitry is further configured to:
  discontinue acquisition of the detected frame; and
  start a simultaneous channel access period for restriction of transmit power for the duration,
  wherein the processing circuitry is to cause the STA to transmit the second frame to the AP during the simultaneous channel access period.

15. The computer-readable storage medium of claim 14, wherein the processing circuitry is further configured to determine if a power level of the detected frame is below a predetermined threshold, and
  cause the STA to transmit the second frame to the AP during the duration if the power level of the received frame is below the predetermined threshold.

16. The computer-readable storage medium of claim 14 wherein the transmit power level for transmission of the second frame is adjusted to be below a detection level of the overlapping WLAN.

17. The computer-readable storage medium of claim 14, wherein the processing circuitry is configured to refrain from updating a network allocation vector (NAV) of the STA upon detection of the frame from the overlapping WLAN when the detected frame indicates that simultaneous channel access is allowed and when the power level of the detected frame is below a predetermined threshold.

* * * * *

UNITED STATES PATENT AND TRADEMARK OFFICE
CERTIFICATE OF CORRECTION

PATENT NO. : 10,375,728 B2  
APPLICATION NO. : 15/601355  
DATED : August 6, 2019  
INVENTOR(S) : Ross et al.

Page 1 of 1

It is certified that error appears in the above-identified patent and that said Letters Patent is hereby corrected as shown below:

On the Title Page

In item (54), in "Title", and in the Specification, in Column 1, Lines 1-4, Delete "ENHANCED CHANNEL ACCESS MECHANISM FOR IMPROVING PERFORMANCE IN DENSE WIFI ENVIRONMENTS" and insert --SIMULTANEOUS CHANNEL ACCESS FOR OVERLAPPING BSS(OBSS)-- therefor Signed and Sealed this  
Seventeenth Day of November, 2020

Andrei Iancu  
*Director of the United States Patent and Trademark Office*